United States Patent
Mukasa

(10) Patent No.: US 7,693,380 B2
(45) Date of Patent: Apr. 6, 2010

(54) OPTICAL TRANSMISSION LINE AND OPTICAL TRANSMISSION SYSTEM

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/361,281

(22) Filed: Jan. 28, 2009

(65) Prior Publication Data
US 2009/0162020 A1   Jun. 25, 2009

Related U.S. Application Data

(63) Continuation of application No. PCT/JP2008/063795, filed on Jul. 31, 2008.

(30) Foreign Application Priority Data

Aug. 9, 2007   (JP) .............................. 2007-207741

(51) Int. Cl.
  *G02B 6/032*   (2006.01)
(52) U.S. Cl. ...................... 385/125; 385/123
(58) Field of Classification Search ........................ None
  See application file for complete search history.

(56) References Cited

U.S. PATENT DOCUMENTS

| | | | | |
|---|---|---|---|---|
| 5,191,631 | A * | 3/1993 | Rosenberg | 385/123 |
| 2001/0031118 | A1 | 10/2001 | Hasegawa et al. | |
| 2002/0061176 | A1 * | 5/2002 | Libori et al. | 385/125 |
| 2004/0136669 | A1 * | 7/2004 | Hasegawa et al. | 385/125 |
| 2005/0157998 | A1 * | 7/2005 | Dong et al. | 385/126 |
| 2005/0225841 | A1 * | 10/2005 | Bragheri et al. | 359/334 |
| 2006/0159410 | A1 * | 7/2006 | Saito et al. | 385/125 |
| 2009/0046984 | A1 | 2/2009 | Mukasa | |

FOREIGN PATENT DOCUMENTS

JP   2001-235649   8/2001

OTHER PUBLICATIONS

U.S. Appl. No. 12/406,592, filed Mar. 18, 2009, Mukasa.
Kyozo Tsujikawa et al., Application of a Prechirp Technique to 10-Gb/s Transmission at 1064 nm Through 24 km of Photonic Crystal Fiber, IEEE Photonics Technology Letters, vol. 18, No. 19, Oct. 1, 2006, p. 2026-2028.
Koji Ieda et al., Visible to infrared high-speed WDM transmission over PCF, IEICE Electronics Express, Jun. 25, 2007, vol. 4, No. 12, p. 375-379.
Kenji Kurokawa et al., Penalty-free dispersion-managed soliton transmission over 100km low loss PCF, Technical report of IEICE OCS, vol. 105, No. 243, Aug. 19, 2005, p. 17-21.
K. Ieda et al., Visible to Infrared WDM Transmission over PCF, ECOC2006-Tu3.3.4.

* cited by examiner

*Primary Examiner*—Mike Stahl
(74) *Attorney, Agent, or Firm*—Oblon, Spivak, McClelland, Maier & Neustadt, L.L.P.

(57) ABSTRACT

An optical transmission line includes a first optical fiber and a second optical fiber connected to the first optical fiber. The first optical fiber includes a core region formed at a center of the fiber and a cladding region formed around the core region. The cladding region includes air holes formed in a triangular lattice around the core region. The first optical fiber has a negative wavelength dispersion and a dispersion per slope of −200 nm to −50 nm at a wavelength of 1050 nm. The second optical fiber has a positive wavelength dispersion and the dispersion per slope of −800 nm to −50 nm at the wavelength of 1050 nm.

9 Claims, 9 Drawing Sheets

| | d/Λ | | | | | | |
|---|---|---|---|---|---|---|---|
| | 0.3 | 0.4 | 0.5 | 0.6 | 0.7 | 0.8 | 0.9 |
| Λ[μm] 1 | -619.5 | -225.5 | 141.6 | 28.7 | -149.3 | -331.0 | -454.2 |
| 1.1 | -0.8 | -9.0 | 115.8 | -147.8 | -569.9 | -1088.8 | -1403.6 |
| 1.2 | 18.9 | 39.4 | -1.2 | -708.8 | -4419.6 | 80684.7 | 48894.8 |
| 1.3 | 3.0 | 131.9 | -358.5 | 4209.7 | 1746.3 | 1756.6 | 2088.2 |
| 1.4 | -5636.2 | 299.3 | 1768.9 | 886.6 | 904.4 | 1033.4 | 1230.8 |
| 1.5 | 235.5 | -24753.1 | 518.6 | 572.1 | 678.4 | 775.5 | 923.6 |

FIG.8

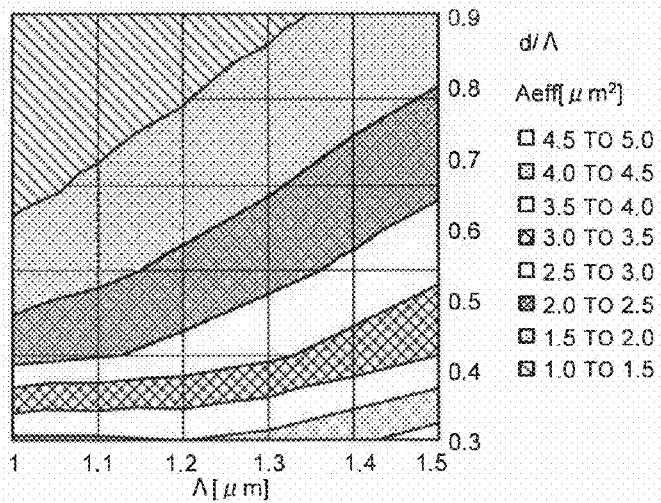

FIG.9

| | d/Λ | Λ | NUMBER OF LAYERS | CON-FINEMENT LOSS | WAVELENGTH DISPERSION | DPS VALUE | Aeff | MODE |
|---|---|---|---|---|---|---|---|---|
| | | μm | | dB/km | ps/nm/km | nm | μm² | |
| CALCULATION EXAMPLE 1 | 0.30 | 6.0 | 7 | <0.01 | -22.2 | -117.9 | 64.3 | SM |
| CALCULATION EXAMPLE 2 | 0.30 | 7.0 | 7 | <0.01 | -24.0 | -128.5 | 86.0 | SM |
| CALCULATION EXAMPLE 3 | 0.30 | 8.0 | 7 | <0.01 | -25.3 | -136.1 | 110.9 | SM |
| CALCULATION EXAMPLE 4 | 0.30 | 9.0 | 6 | <0.01 | -26.3 | -141.6 | 139.0 | SM |
| CALCULATION EXAMPLE 5 | 0.40 | 8.0 | 5 | <0.01 | -24.3 | -130.0 | 87.8 | SM |
| CALCULATION EXAMPLE 6 | 0.40 | 9.0 | 5 | <0.01 | -25.5 | -136.7 | 110.3 | SM |
| CALCULATION EXAMPLE 7 | 0.40 | 10.0 | 5 | <0.01 | -26.3 | -141.7 | 135.4 | SM |
| CALCULATION EXAMPLE 8 | 0.40 | 11.0 | 4 | <0.01 | -27.0 | -148.4 | 163.2 | SM |
| CALCULATION EXAMPLE 9 | 0.50 | 7.0 | 4 | <0.01 | -21.4 | -112.5 | 55.8 | SM |
| CALCULATION EXAMPLE 10 | 0.50 | 8.0 | 4 | <0.01 | -23.3 | -123.3 | 72.5 | SM |
| CALCULATION EXAMPLE 11 | 0.50 | 9.0 | 4 | <0.01 | -24.6 | -131.5 | 91.4 | SM |
| CALCULATION EXAMPLE 12 | 0.50 | 10.0 | 4 | <0.01 | -25.6 | -137.1 | 112.0 | SM |
| CALCULATION EXAMPLE 13 | 0.50 | 12.0 | 4 | <0.01 | -26.9 | -144.9 | 160.3 | SM |
| CALCULATION EXAMPLE 14 | 0.60 | 7.0 | 4 | <0.01 | -19.8 | -102.9 | 47.0 | SM |
| CALCULATION EXAMPLE 15 | 0.60 | 8.0 | 4 | <0.01 | -22.0 | -116.4 | 60.9 | SM |
| CALCULATION EXAMPLE 16 | 0.60 | 9.0 | 4 | <0.01 | -23.6 | -125.7 | 76.6 | SM |
| CALCULATION EXAMPLE 17 | 0.60 | 10.0 | 4 | <0.01 | -24.8 | -132.6 | 94.1 | SM |
| CALCULATION EXAMPLE 18 | 0.70 | 8.0 | 4 | <0.01 | -20.6 | -108.1 | 51.2 | MM |
| CALCULATION EXAMPLE 19 | 0.70 | 9.0 | 4 | <0.01 | -22.5 | -118.9 | 64.4 | MM |
| CALCULATION EXAMPLE 20 | 0.70 | 10.0 | 4 | <0.01 | -23.8 | -126.9 | 79.1 | MM |

| | d/Λ | Λ | NUMBER OF LAYERS | CON-FINEMENT LOSS | WAVELENGTH DISPERSION | DPS VALUE | Aeff | MODE |
|---|---|---|---|---|---|---|---|---|
| | | μm | | dB/km | ps/nm/km | nm | μm² | |
| CALCULATION EXAMPLE 21 | 0.80 | 0.9 | 6 | <0.01 | 47.1 | -70 | 1.06 | SM |
| CALCULATION EXAMPLE 22 | 0.70 | 1.0 | 6 | <0.01 | 54.2 | -149.3 | 1.39 | SM |
| CALCULATION EXAMPLE 23 | 0.80 | 1.0 | 5 | <0.01 | 107.6 | -331.0 | 1.18 | SM |
| CALCULATION EXAMPLE 24 | 0.90 | 1.0 | 5 | <0.01 | 155.3 | -454.2 | 1.02 | SM |
| CALCULATION EXAMPLE 25 | 0.60 | 1.1 | 7 | <0.01 | 33.1 | -147.8 | 1.89 | SM |
| CALCULATION EXAMPLE 26 | 0.70 | 1.1 | 6 | <0.01 | 86.6 | -569.9 | 1.56 | SM |
| CALCULATION EXAMPLE 27 | 0.60 | 1.2 | 6 | <0.01 | 55.9 | -708.8 | 2.10 | SM |
| CALCULATION EXAMPLE 28 | 0.50 | 1.3 | 8 | <0.01 | 20.9 | -358.5 | 2.92 | SM |

OPTICAL TRANSMISSION LINE AND OPTICAL TRANSMISSION SYSTEM

CROSS-REFERENCE TO RELATED APPLICATIONS

This application is a continuation of PCT/JP2008/063795 filed on Jul. 31, 2008, the entire content of which are incorporated herein by reference.

BACKGROUND OF THE INVENTION

1. Field of the Invention

The present invention relates to an optical transmission line and an optical transmission system for transmitting an optical signal in a wavelength band of 1.0 μm.

2. Description of the Related Art

A holey fiber or a photonic crystal fiber is a new type of an optical fiber that includes a core region at its center and a cladding region arranged on an outer circumference of the core region. The cladding region includes a plurality of air holes around the core region to propagate light in the core region by lowering average refractive index of the cladding region using the air holes and by utilizing the principle of total reflection of light. The holey fiber controls the refractive index using the air holes, so that specific characteristics, such as an Endlessly Single Mode (ESM), which has been unachievable by conventional optical fibers, zero-dispersion wavelength, which is shifted toward a side of extremely short wavelengths, or the like, can be realized. The ESM means characteristics in which the cutoff wavelength does not exist and lights at all wavelengths are transmitted in the single mode, so that high-transmission-speed optical transmission can be achieved across a broad bandwidth.

On the other hand, recently a technology for an Ytterbium-doped optical fiber (YDF) usable as an amplifying optical fiber in a wavelength band of 1.0 μm having a wavelength bandwidth from 1000 nm to 1100 nm or 1300 nm has been being matured. Accordingly, there are increasing demands for a fiber laser for the 1.0-μm wavelength band, an optical fiber for an SC light source, and an optical fiber applicable to an optical transmission line and the like. A holey fiber is expected to meet such a demand. For example, in K. Ieda, et al., "Visible to Infrared WDM transmission over PCF", ECOC2006-Tu3.3.4 (2006), results are reported of experiment on light transmissions across a broad bandwidth including a wavelength of 1064 nm using a holey fiber as an optical transmission line.

In a conventional holey fiber, however, a wavelength dispersion in the 1.0-μm wavelength band is, for example, equal to or less than −20 ps/nm/km, so that an absolute value of the wavelength dispersion is large. Accordingly, when using this holey fiber as an optical transmission line to transmit an optical signal in the 1.0-μm wavelength band, there is a problem that the optical signal severely distorts and its quality degrades. Furthermore, because the conventional holey fiber has a dispersion slope, an optical signal differently distorts depending on the wavelength. Therefore, when using, for example, a wavelength-division multiplexing (WDM) signal as an optical signal, the quality of the optical signal may vary depending on the wavelength of the optical signal. Accordingly, the conventional holey fiber is not appropriate for an optical transmission across a broad bandwidth.

SUMMARY OF THE INVENTION

It is an object of the present invention to at least partially solve the problems in the conventional technology.

According to one aspect of the present invention, there is provided an optical transmission line including a first optical fiber and a second optical fiber connected to the first optical fiber. The first optical fiber includes a core region formed at a center of the fiber, and a cladding region formed around the core region, the cladding region including air holes formed in a triangular lattice around the core region. The first optical fiber has a negative wavelength dispersion and a dispersion per slope of −200 nm to −50 nm at a wavelength of 1050 nm. The second optical fiber has a positive wavelength dispersion and the dispersion per slope of −800 nm to −50 nm at the wavelength of 1050 nm.

Furthermore, according to another aspect of the present invention, there is provided an optical transmission system including an optical transmitter that outputs an optical signal; an optical transmission line that is connected to the optical transmitter and transmits the optical signal output from the optical transmitter; and an optical receiver that is connected to the optical transmission line and receives the optical signal transmitted by the optical transmission line. The optical transmission line includes a first optical fiber that includes a core region formed at a center of the fiber, and a cladding region formed around the core region, the cladding region including air holes formed in a triangular lattice around the core region, and a second optical fiber connected to the first optical fiber. The first optical fiber has a negative wavelength dispersion and a dispersion per slope of −200 nanometers to −50 nanometers at a wavelength of 1050 nanometers. The second optical fiber has a positive wavelength dispersion and the dispersion per slope of −800 nanometers to −50 nanometers at the wavelength of 1050 nanometers. The optical transmission line is connected to the optical transmitter at the first optical fiber side.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a graph explaining results of more detailed calculations in a region where Λ is 1 μm to 1.5 μm shown in FIG. 7;

FIG. 9 is a table explaining design parameters and optical characteristics at the wavelength of 1050 nm of holey fibers in calculation examples 1 to 20, for which preferable values are set to the design parameters of Λ, d/Λ, and the number of air hole layers;

DETAILED DESCRIPTION OF THE PREFERRED EMBODIMENTS

Exemplary embodiments of an optical transmission line and an optical transmission system according to the present invention are explained in detail below with reference to the accompanying drawings. However, the present invention is not limited to the present embodiments. Unless otherwise specified herein, the terms are in accordance with the definitions or measurement methods in ITU-T (International Telecommunication Union Telecommunication Standardization Sector) G.650.1.

Figure 1:
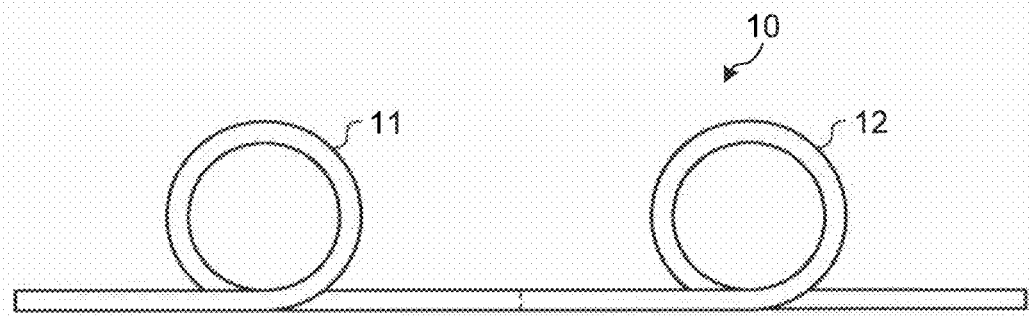
FIG. 1 is a block diagram explaining a schematic configuration of an optical transmission line according to a first embodiment of the present invention.

FIG. 1 is a block diagram explaining a schematic configuration of an optical transmission line 10 according to a first embodiment of the present invention. As shown in FIG. 1, the optical transmission line 10 includes a negative-dispersion holey fiber 11 and a dispersion-compensating holey fiber 12 that is a dispersion-compensating optical fiber connected to the negative-dispersion holey fiber 11.

Figure 2:
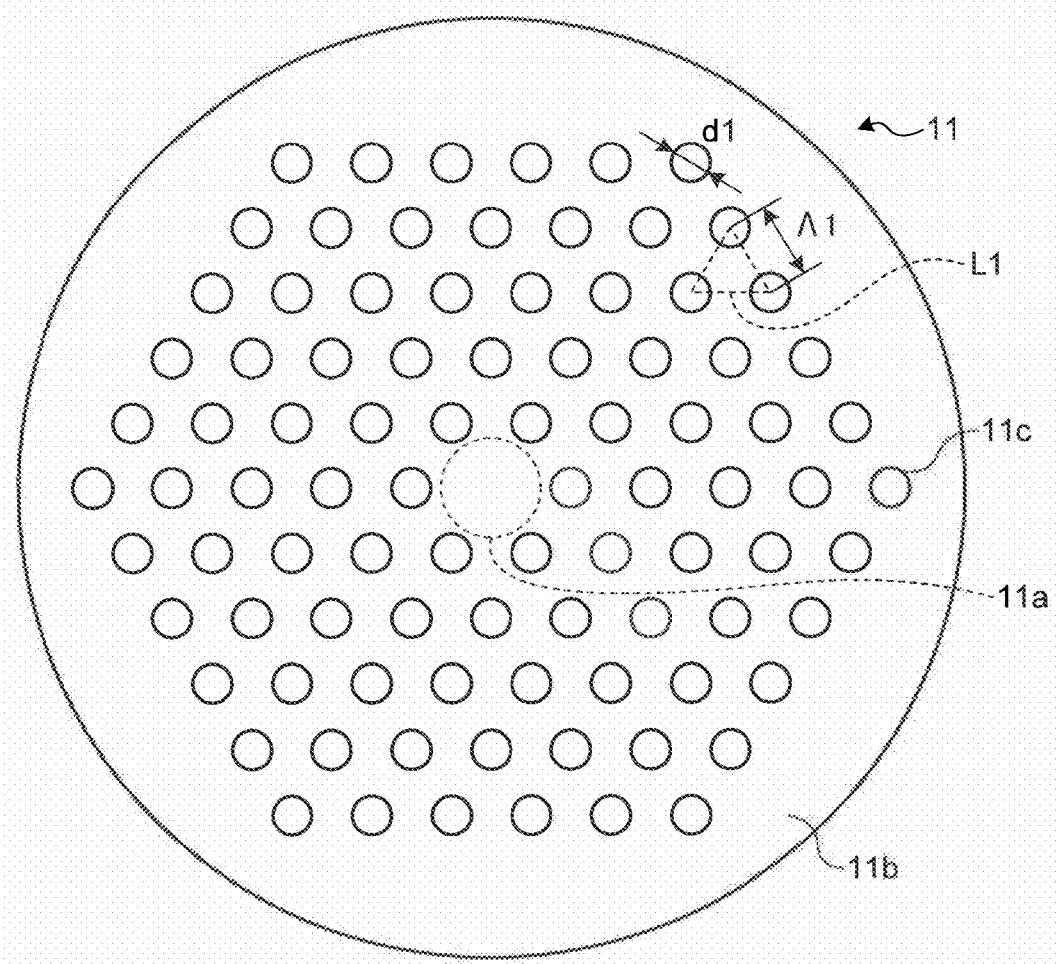
FIG. 2 is a schematic cross section of a negative-dispersion holey fiber shown in FIG. 1.

FIG. 2 is a schematic cross section of the negative-dispersion holey fiber 11 shown in FIG. 1. As shown in FIG. 2, the negative-dispersion holey fiber 11 includes a core region 11a arranged at a center and a cladding region 11b arranged on an outer circumference of the core region 11a. The core region 11a and the cladding region 11b are both made of pure silica glass without doping a dopant for adjusting refractive index.

The cladding region 11b has air holes 11c formed around the core region 11a. The adjacent air holes 11c are arranged to form a triangular lattice L1. A diameter of each of the air holes 11c is d1 and a lattice constant of the triangular lattice L1, that is, a pitch between centers of the adjacent air holes 11c is Λ1. Furthermore, the air holes 11c are placed on sides and vertexes of different regular hexagons relative to a center point of the core region 11a. Assuming that a combination of the air holes 11c placed on the same regular hexagon is a single layer, the air holes 11c are arranged in a five-layer structure in the first embodiment.

Figure 3:
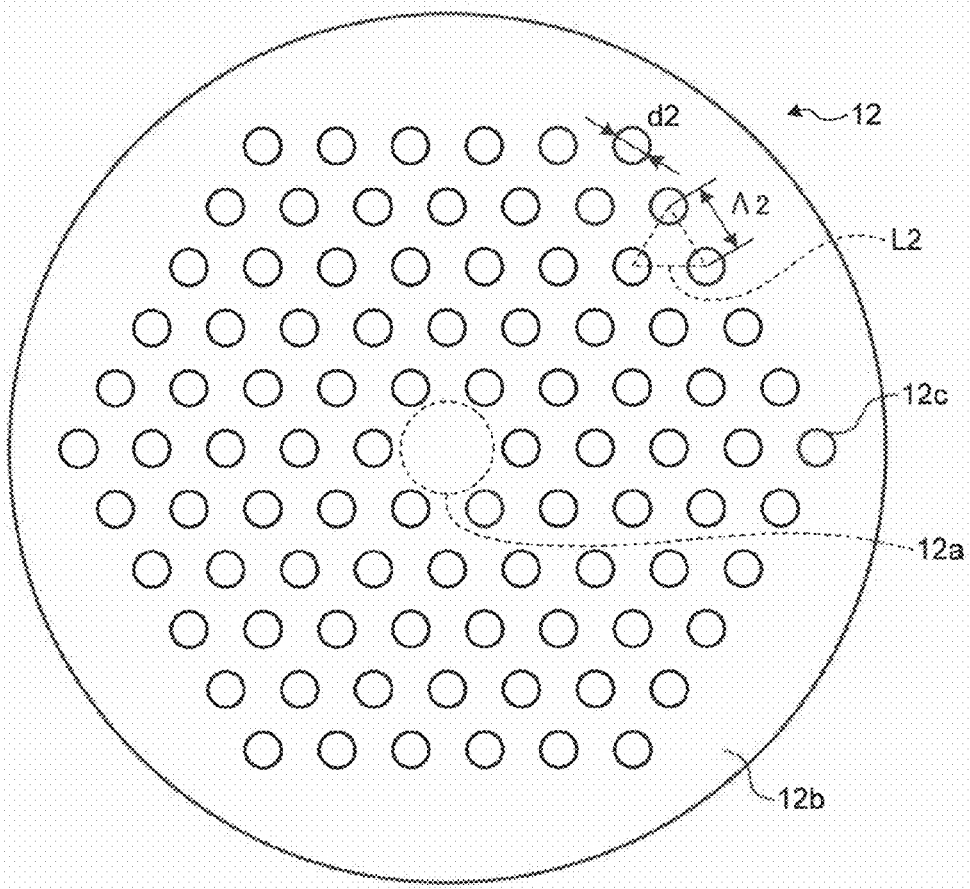
FIG. 3 is a schematic cross section of a dispersion-compensating holey fiber shown in FIG. 1.

By contrast, FIG. 3 is a schematic cross section of the dispersion-compensating holey fiber 12 shown in FIG. 1. As shown in FIG. 3, the dispersion-compensating holey fiber 12 is a holey fiber having a structure similar to that of the negative-dispersion holey fiber 11. A core region 12a and a cladding region 12b are both made of pure silica glass, and adjacent air holes 12c are arranged to form a triangular lattice L2. A diameter of each of the air holes 12c is d2 and a pitch between centers of the adjacent air holes 12c is Λ2. The air holes 12c are arranged in a five-layer structure in the first embodiment.

In the negative-dispersion holey fiber 11, a wavelength dispersion is negative and a DPS (Dispersion Per Slope) value obtained by dividing the wavelength dispersion by a dispersion slope value is −200 nm to −50 nm at a wavelength of 1050 nm. By contrast, in the dispersion-compensating holey fiber 12, the wavelength dispersion is positive and the DPS value is −800 nm to −50 nm at the wavelength of 1050 nm. That is, the optical transmission line 10 is configured by coupling the negative-dispersion holey fiber 11 to the dispersion-compensating holey fiber 12. Between the negative-dispersion holey fiber 11 and the dispersion-compensating holey fiber 12, signs of the wavelength dispersions differ and the DPS values are similar levels. Therefore, the wavelength dispersion and the dispersion slope are concurrently compensated, the wavelength dispersion across a broad bandwidth including the wavelength of 1050 nm is reduced, and the wavelength dispersion is less dependent on the wavelength. Moreover, if the DPS value is −200 nm to −50 nm, an effective core area increases, so that optical nonlinearity can be reduced and confinement loss can be reduced. Therefore, the optical transmission line 10 is suitable for optical transmission across a broad bandwidth in the wavelength band of 1.0 μm.

Design parameters to realize the negative-dispersion holey fiber 11 and the dispersion-compensating holey fiber 12 as described above and various characteristics obtained by the design parameters are specifically explained using results of calculation obtained by a simulation using a finite element method (FEM).

Figure 4:
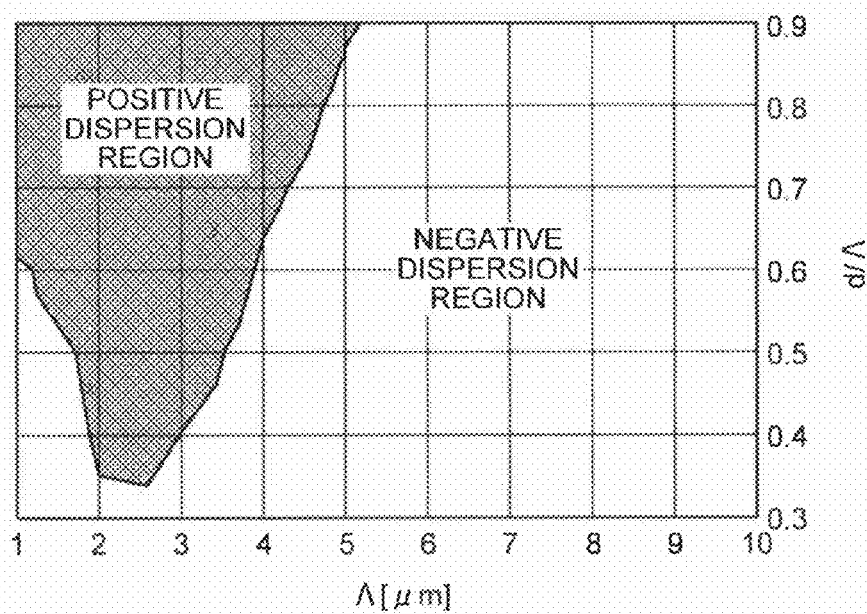
FIG. 4 is a graph explaining a relation between Λ and d/Λ with signs of wavelength dispersion at a wavelength of 1050 nm in holey fibers having a similar structure to that shown in FIG. 2.
Figure 5:
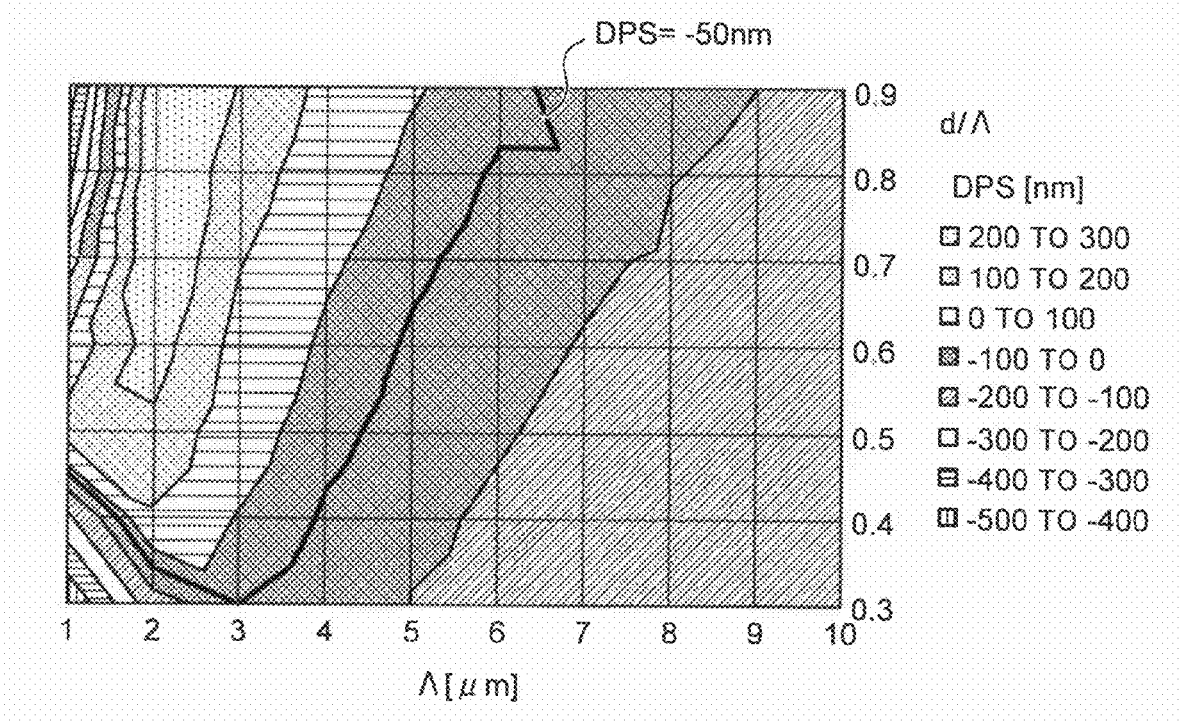
FIG. 5 is a graph explaining a relation between Λ and d/Λ with a DPS value at the wavelength of 1050 nm in a holey fiber having a similar structure to that shown in FIG. 2.
Figures 6, 7:
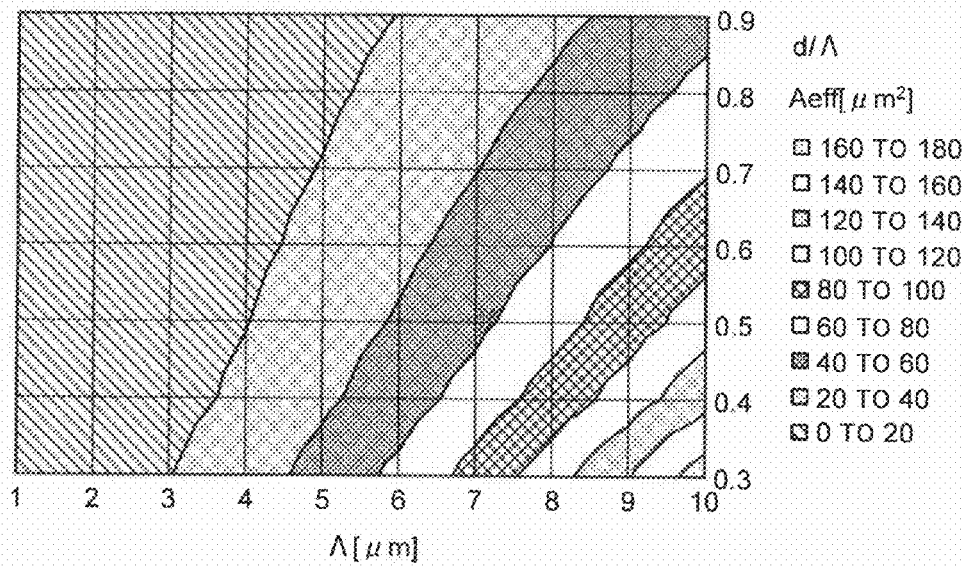
FIG. 6 is a table explaining results of more detailed calculations in a region where Λ is 1 μm to 1.5 μm shown in FIG. 5.
FIG. 7 is a graph explaining a relation between Λ and d/Λ with an effective core area Aeff at the wavelength of 1050 nm in holey fibers having a similar structure to that shown in FIG. 2.

FIGS. 4, 5, 7 are graphs explaining relations between Λ and d/Λ with signs of wavelength dispersion, DPS value, and effective core area Aeff at the wavelength of 1050 nm in holey fibers having a similar structure to that shown in FIG. 2. FIG. 6 is a table explaining results of more detailed calculations in a region where Λ is 1 μm to 1.5 μm shown in FIG. 5. FIG. 8 is a graph explaining results of more detailed calculations in a region where Λ is 1 μm to 1.5 μm shown in FIG. 7. As shown in FIG. 4, there are a positive dispersion region in which the sign of wavelength dispersion is positive and a negative dispersion region in which the sign of wavelength dispersion is negative in a combination of the Λ and the d/Λ. By referring to FIGS. 4, 5, and 6, there are solutions for the combinations of the Λ and the d/Λ in which the DPS values are similar levels between the positive dispersion region and the negative dispersion region. As shown in FIG. 7, the effective core area increases as the effective core area is reaching toward the lower right region in which the Λ increases and the d/Λ decreases. As shown in FIG. 4, this region is the negative dispersion region. Namely, the holey fibers having a similar structure to that shown in FIG. 2 can realize an increased effective core area in the negative dispersion region, so that optical nonlinearity can be reduced. In FIGS. 4, 5, and 7, a region in which Λ is from 10 μm to 12 μm is not shown, however, each characteristics in this region is a characteristics that tends to be successive from the characteristics observed in the region where the Λ is equal to or less than 10 μm. This region is represented as the negative dispersion region shown in FIG. 4 and as the region with the DPS value in a range from −200 nm to −100 nm shown in FIG. 5. In FIG. 7, this region is represented as the region in which the effective core area increases as the d/Λ decreases.

As shown in FIG. 5, if the Λ1 is 5 μm to 12 μm and d1/Λ1 is 0.2 to 0.8 for the negative-dispersion holey fibers 11, the DPS value of −200 nm to −50 nm is attainable. On the other hand, as the Λ increases, bending loss characteristics degrades. Furthermore, as the d/Λ decreases, it is getting harder to confine light into the core region, so that the number of the air hole layers required increases to keep confinement loss equal to or less than 0.1 dB/km. If the number of the air hole layers increases, for example, to equal to or more than eight layers, the total number of the air holes will be equal to or more than 200, leading to complicated manufacturing. As the Λ and the d/Λ increase, it is getting harder to maintain a single-mode operation at a wavelength of 1000 nm.

Therefore, it is preferable that the Λ1 be 6 μm to 12 μm and the d1/Λ1 be 0.3 to 0.7 for the negative-dispersion holey fiber 11 according to the first embodiment. If the Λ1 is 6 μm to 12 μm and the d1/Λ1 is 0.3 to 0.7, the confinement loss of equal to or less than 0.1 dB/km is attainable while keeping the number of the air hole layers equal to or less than seven layers. In addition, the effective core area can be made equal to or larger than 45 μm$^2$, so that optical nonlinearity equivalent to or lower than that for a dispersion-shifted optical fiber (DSF) generally used as an optical transmission line and defined in ITU-T G.653 is attainable. In this case, the wavelength dispersion is −30 ps/nm/km to −15 ps/nm/km and the DPS value is −150 nm to −100 nm for the negative-dispersion holey fiber 11 at the wavelength of 1050 nm.

Preferable design parameters for the negative-dispersion holey fiber 11 according to the first embodiment are explained based on specific calculation examples. FIG. 9 is a table explaining design parameters and optical characteristics at the wavelength of 1050 nm of holey fibers in calculation examples 1 to 20, for which preferable values are set to the design parameters of Λ, d/Λ, and the number of air hole layers. In FIG. 9, "mode" represents a state of a propagation mode of a holey fiber. "SM" represents that a holey fiber performs a single-mode operation and "MM" represents that a holey fiber performs a multimode operation. As shown in FIG. 9, the calculation examples 1 to 20 exhibit satisfactory values in any of confinement loss, DPS value, and effective core area. Moreover, in any of the calculation examples 1 to 20, bending loss for a diameter of 20 mm is equal to or less than 10 dB/m at wavelengths of 1050 nm and 1550 nm and realizes values usable as an optical transmission line.

Next, the dispersion-compensating holey fiber 12 according to the first embodiment is specifically explained. As described above, the dispersion-compensating holey fiber 12 has the DPS value of −800 nm to −50 nm at the wavelength of 1050 nm, of which absolute value is in a range larger than that of the DPS value for the negative-dispersion holey fiber 11.

In this manner, if the absolute value of the DPS for the dispersion-compensating holey fiber 12 at the wavelength of 1050 nm is set to be larger than the absolute value of the DPS for the negative-dispersion holey fiber 11 at the wavelength of 1050 nm, even when there is necessity of compensating wavelength dispersion in a broader wavelength bandwidth between 1000 nm and 1300 nm later, residual dispersion within the wavelength bandwidth can be reduced. The detail will be explained later.

As shown in FIG. 5, if the Λ2 is 0.9 μm to 1.3 μm and d2/Λ2 is 0.5 to 0.9 for the dispersion-compensating holey fiber 12, the DPS value of −800 nm to −50 nm is attainable. Furthermore, as shown in FIGS. 4, 6, the effective core area of a holey fiber is reduced in the positive dispersion region. However, in view of connectivity to another optical fiber, it is preferable that the effective core area be equal to or larger than 1.0 μm$^2$.

In light of the above, in the dispersion-compensating holey fiber 12 according to the first embodiment, it is preferable that the design parameters be such that the Λ2 is 0.9 μm to 1.3 μm and the d2/Λ2 is 0.5 to 0.9. If the Λ2 is 0.9 μm to 1.3 μm and the d2/Λ2 is 0.5 to 0.9, confinement loss can be made equal to or less than 0.1 dB/km at the wavelength of 1050 nm while the number of the air hole layers is equal to or less than seven layers. In addition, the effective core area is equal to or larger than 1.0 μm$^2$. In this case, wavelength dispersion is 20 ps/nm/km to 150 ps/nm/km.

Figures 10, 11:
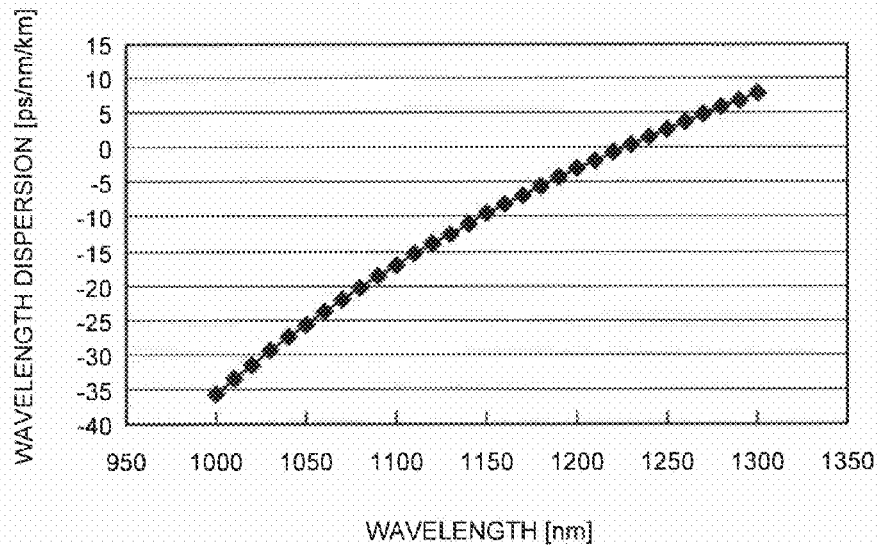
FIG. 10 is a table explaining design parameters and optical characteristics at the wavelength of 1050 nm of holey fibers in calculation examples 21 to 28, for which preferable values are set to the design parameters of Λ, d/Λ, and the number of air hole layers.
FIG. 11 is a graph explaining dispersion characteristics of a negative-dispersion holey fiber when values of calculation example 10 shown in FIG. 9 are set to design parameters.

Preferable design parameters for the dispersion-compensating holey fiber 12 according to the first embodiment are explained based on specific calculation examples. FIG. 10 is a table explaining design parameters and optical characteristics at the wavelength of 1050 nm of holey fibers in the calculation examples 21 to 28, for which preferable values are set to the design parameters of Λ, d/Λ, and the number of air hole layers. As shown in FIG. 10, the calculation examples 21 to 28 exhibit satisfactory values in any of confinement loss, DPS value, and effective core area. Moreover, in any of the calculation examples 21 to 28, bending loss for a diameter of 20 mm is equal to or less than 10 dB/m at wavelengths of 1050 nm and 1550 nm and realizes values usable as an optical transmission line.

Residual dispersion characteristics in the optical transmission line 10 according to the first embodiment are explained. As the design parameters for the negative-dispersion holey fiber 11, the values of the calculation example 10 shown in FIG. 9 are used, so that the DPS value at the wavelength of 1050 nm is −123.3 nm. As the design parameters for the dispersion-compensating holey fiber 12, the values of the calculation example 22 shown in FIG. 10 are used, so that the DPS value at the wavelength of 1050 nm is −149.3 nm that is similar level to the DPS value for the negative-dispersion holey fiber 11. FIG. 11 is a graph explaining dispersion characteristics of the negative-dispersion holey fiber 11 when the values of the calculation example 10 shown in FIG. 9 are set to the design parameters.

Figure 12:
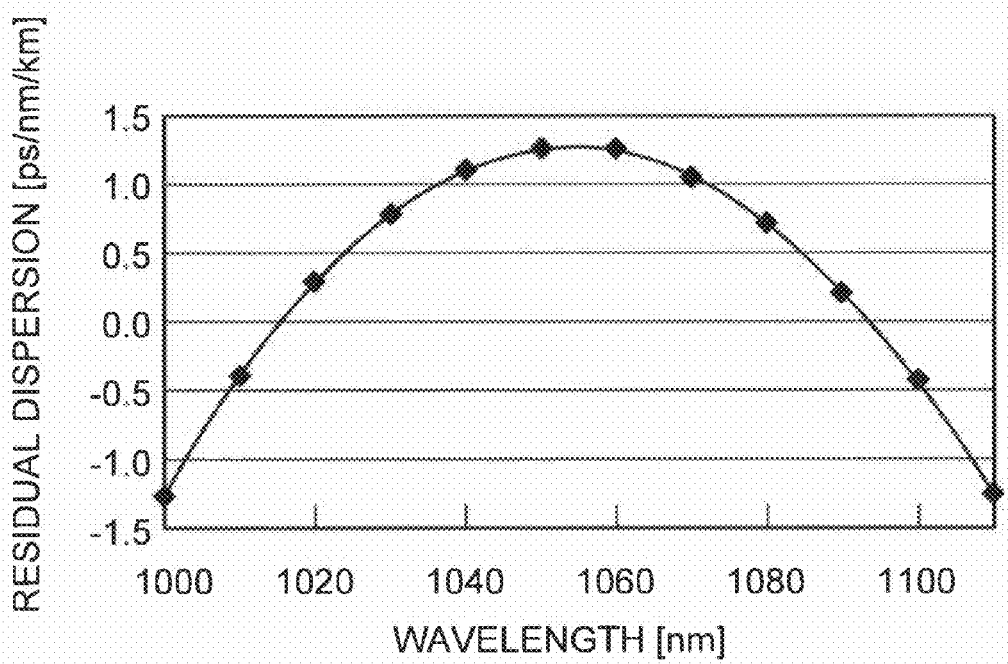
FIG. 12 is a graph explaining residual dispersion in the optical transmission line according to the first embodiment.

FIG. 12 is a graph explaining residual dispersion in the optical transmission line 10 according to the first embodiment. As shown in FIG. 12, the residual dispersion in the optical transmission line 10 is such a considerably small value as ±1.5 ps/nm/km at a wavelength of 1000 nm to 1100 nm. Transmission speed of an optical signal at a transmission distance of 100 km can be made 10 Gbps if the absolute value of the residual dispersion is equal to or less than 10 ps/nm/km, and the transmission speed at a transmission distance of 20 km can be made 40 Gbps if the absolute value of the residual dispersion is equal to or less than 5 ps/nm/km.

Figure 13:
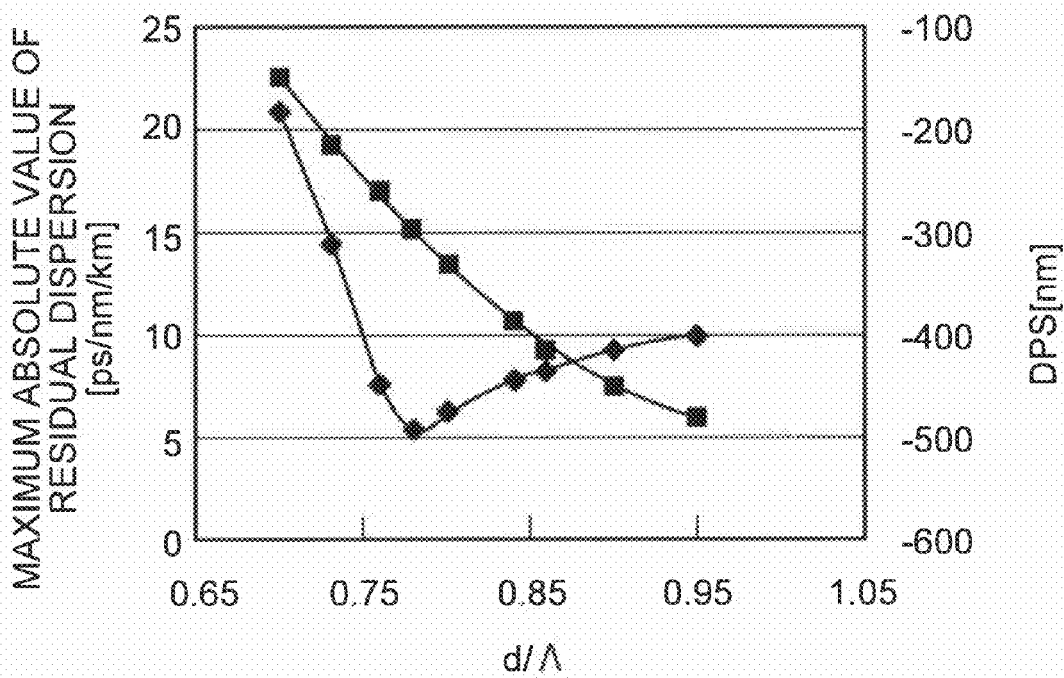
FIG. 13 is a graph explaining relations of d/Λ of a dispersion-compensating holey fiber with a DPS value at the wavelength of 1050 nm and a maximum absolute value of residual dispersion in an optical transmission line at a wavelength of 1000 nm to 1300 nm.
Figure 14:
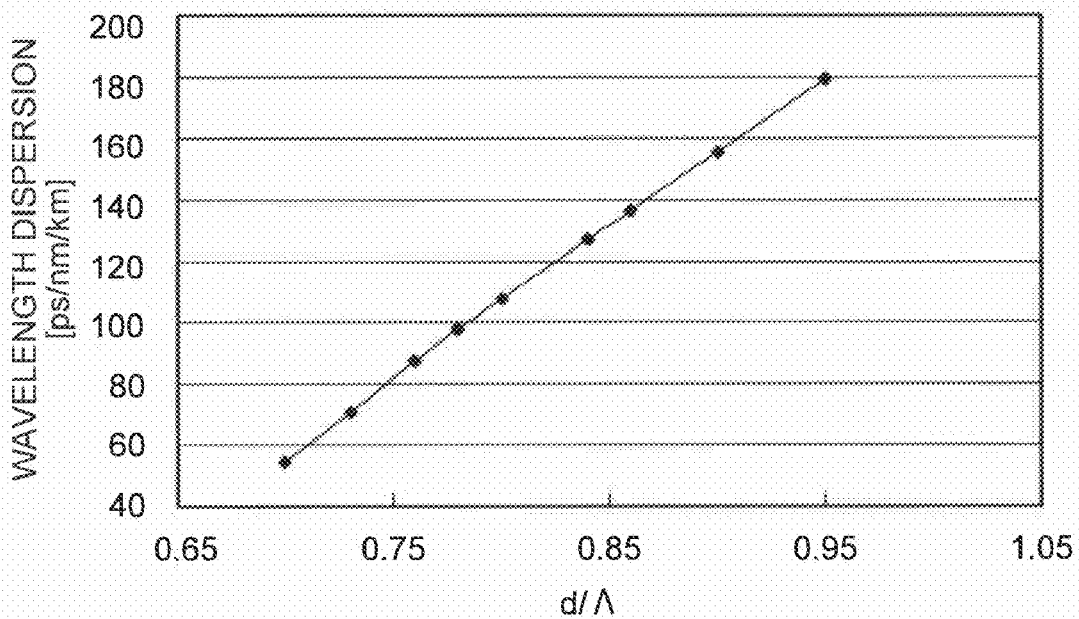
FIG. 14 is a graph explaining a relation between d/Λ of a dispersion-compensating holey fiber and wavelength dispersion at the wavelength of 1050 nm.

A case of dispersion-compensating the optical transmission line 10 according to the first embodiment at a wavelength of 1000 nm to 1300 nm is explained. FIG. 13 is a graph explaining a relation between d/Λ of the dispersion-compensating holey fiber 12 with a DPS value at the wavelength of 1050 nm and a maximum absolute value of residual dispersion in the optical transmission line 10 at a wavelength of 1000 nm to 1300 nm. The dispersion-compensating holey fiber 12 employs 1.0 μm for Λ and six layers for the number of the layers of the air holes 12c. FIG. 14 is a graph explaining a relation between d/Λ of the dispersion-compensating holey fibers 12 and wavelength dispersion at the wavelength of 1050 nm. As shown in FIGS. 13, 14, in the dispersion-compensating holey fiber 12, as the d/Λ increases, the wavelength dispersion and the absolute value of the DPS value increases. When the d/Λ is 0.78 and the DPS value is −300 nm, that is, the absolute value of the DPS value is set to be larger than that for the negative-dispersion holey fiber 11, the maximum absolute value of the residual dispersion in the optical transmission line 10 at the wavelengths of 1000 nm to 1300 nm is minimum; thereby compensating wavelength dispersion most satisfactorily.

Figure 15:
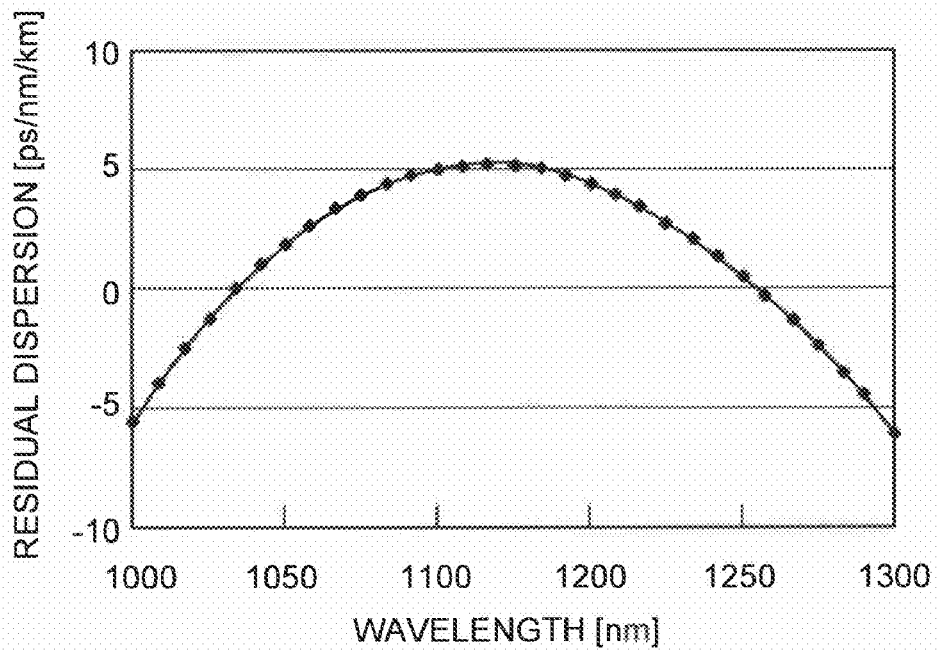
FIG. 15 is a graph explaining residual dispersion in an optical transmission line when a DPS value for a dispersion-compensating holey fiber is made to be −300 nm.

FIG. 15 is a graph explaining residual dispersion in the optical transmission line 10 when a DPS value for the dispersion-compensating holey fiber 12 is made to be −300 nm. As shown in FIG. 15, by setting the larger absolute value of the DPS value for the dispersion-compensating holey fiber 12, the curve showing residual dispersion shifts toward a side of long wavelengths compared with the case shown in FIG. 12. As a result, the curve is nearly symmetrical about approximately 1150 nm that is the center wavelength of the wavelengths of 1000 nm to 1300 nm, and wavelength dispersion in the optical transmission line 10 can be most satisfactorily compensated. As the absolute value of the DPS value for the dispersion-compensating holey fiber 12 increases, the wavelength dispersion increases. Accordingly, the length of the dispersion-compensating holey fiber 12 required for dispersion-compensating can be made short, which is preferable.

Figure 16:
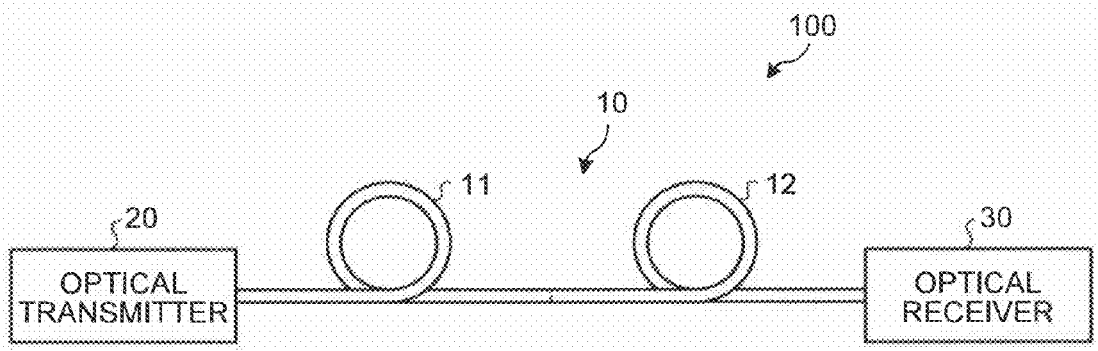
FIG. 16 is a block diagram of an optical transmission system according to a second embodiment of the present invention.

An optical transmission system according to a second embodiment of the present invention is explained. FIG. 16 is a block diagram of an optical transmission system 100 according to the second embodiment. As shown in FIG. 16, the optical transmission system 100 includes an optical transmitter 20 that outputs an optical signal, the optical transmission line 10 according to the first embodiment connected to the optical transmitter 20, and an optical receiver 30 connected to the optical transmission line 10.

The optical transmitter 20 includes a light source such as a fiber laser. An optical signal having any one of wavelengths of 1000 nm to 1100 nm and, for example, a transmission speed of 10 GHz is output from this light source. The optical transmission line 10 transmits the optical signal output from the optical transmitter 20. As stated above, the optical transmission line 10 has less residual dispersion at wavelengths of 1000 nm to 1100 nm, allowing to transmit the optical signal with less distortion. Moreover, the optical receiver 30 includes a photodetector and receives the optical signal transmitted by the optical transmission line 10 with less distortion.

Furthermore, the optical transmission line 10 is connected to the optical transmitter 20 at the side of the negative-dispersion holey fiber 11. The effective core area of the negative-dispersion holey fiber 11 is significantly increased compared with that of the dispersion-compensating holey fiber 12, so that the optical nonlinearity is significantly reduced. Therefore, by coupling the optical transmission line 10 such that an optical signal having high light intensity just after being output from the optical transmitter 20 is firstly input into the negative-dispersion holey fiber 11, an adverse effect on the optical signal caused by the optical nonlinearity of the optical transmission line 10 can be suppressed.

In the second embodiment, the optical transmitter 20 and the optical receiver 30 are connected with the single optical transmission line 10; however, can be connected with an optical transmission line configured by continuously coupling a plurality of the optical transmission lines 10 via a regenerative repeater. In this case, as the regenerative repeater, for example, an optical fiber amplifier using YDF can be employed.

In the first and second embodiments, a holey fiber is used for the dispersion-compensating optical fiber; however, it is not limited to the present embodiments as far as the dispersion-compensating optical fiber has a positive wavelength dispersion and a DPS value of −800 nm to −50 nm. For example, a high-order-mode dispersion-compensating optical fiber (HOM-DCF) as reported by Siddharth Ramachandran, et al., OFC/NFOEC 2007 Technical Digest, OWI1 is usable.

According to one aspect of the present invention, an optical transmission line and an optical transmission system suitable for an optical transmission across a broad bandwidth in a wavelength band of 1.0 μm are advantageously attainable.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission line comprising:
   a first optical fiber that includes
      a core region formed at a center of the fiber, and
      a cladding region formed around the core region, the cladding region including air holes formed in a triangular lattice around the core region; and
   a second optical fiber connected to the first optical fiber, wherein
   the first optical fiber has a negative wavelength dispersion and a dispersion per slope of −200 nanometers to −50 nanometers at a wavelength of 1050 nanometers, and
   the second optical fiber has a positive wavelength dispersion and the dispersion per slope of −800 nanometers to −50 nanometers at the wavelength of 1050 nanometers.

2. The optical transmission line according to claim 1, wherein an absolute value of a residual dispersion at a wavelength of 1000 nanometers to 1100 nanometers is equal to or smaller than 5 ps/nm/km.

3. The optical transmission line according to claim 1, wherein an absolute value of a residual dispersion at a wavelength of 1000 nanometers to 1300 nanometers is equal to or smaller than 10 ps/nm/km.

4. The optical transmission line according to claim 1, wherein the first optical fiber has
   Λ1 of 6 micrometers to 12 micrometers and d1/Λ1 of 0.3 to 0.7, where d1 is diameter of each of the air holes in micrometers and Λ1 is lattice constant of the triangular lattice in micrometers,
   a confinement loss of equal to or smaller than 0.1 dB/km,
   a wavelength dispersion of −30 ps/nm/km to −15 ps/nm/km, and
   the dispersion per slope of −150 nanometers to −100 nanometers at the wavelength of 1050 nanometers.

5. The optical transmission line according to claim 1, wherein the first optical fiber has an effective core area of equal to or larger than 45 μm² at the wavelength of 1050 nanometers.

6. The optical transmission line according to claim 1, wherein the second optical fiber is a holey fiber that includes
   a core region formed at a center of the fiber, and
   a cladding region formed around the core region, the cladding region including air holes formed in a triangular lattice around the core region.

7. The optical transmission line according to claim 6, wherein the second optical fiber has
   Λ2 of 0.9 micrometer to 1.3 micrometers and d2/Λ2 of 0.5 to 0.9, where d2 is diameter of each of the air holes in micrometers and Λ2 is lattice constant of the triangular lattice in micrometers, a confinement loss of equal to or smaller than 0.1 dB/km, and a wavelength dispersion of 20 ps/nm/km to 150 ps/nm/km at the wavelength of 1050 nanometers.

8. The optical transmission line according to claim 7, wherein the second optical fiber has an effective core area of equal to or larger than 1.0 µm² at the wavelength of 1050 nanometers.

9. An optical transmission system comprising:

an optical transmitter that outputs an optical signal;

an optical transmission line that is connected to the optical transmitter and transmits the optical signal output from the optical transmitter, the optical transmission line including a first optical fiber that includes a core region formed at a center of the fiber, and a cladding region formed around the core region, the cladding region including air holes formed in a triangular lattice around the core region, and a second optical fiber connected to the first optical fiber, wherein the first optical fiber has a negative wavelength dispersion and a dispersion per slope of −200 nanometers to −50 nanometers at a wavelength of 1050 nanometers, and the second optical fiber has a positive wavelength dispersion and the dispersion per slope of −800 nanometers to −50 nanometers at the wavelength of 1050 nanometers; and an optical receiver that is connected to the optical transmission line and receives the optical signal transmitted by the optical transmission line, wherein the optical transmission line is connected to the optical transmitter at the first optical fiber side.

* * * * *